(12) United States Patent
Bourgine

(10) Patent No.: US 7,630,482 B2
(45) Date of Patent: Dec. 8, 2009

(54) ADAPTATION OF THE CALL SEQUENCE BY ANALYSIS OF THE HISTORY OF THE PRECEDING COMMUNICATION SEQUENCES

(75) Inventor: Paul Bourgine, Paris (FR)

(73) Assignee: Jean-Louis Vullierme (BE)

( * ) Notice: Subject to any disclaimer, the term of this patent is extended or adjusted under 35 U.S.C. 154(b) by 0 days.

(21) Appl. No.: 10/046,124

(22) Filed: Dec. 28, 2001

(65) Prior Publication Data

US 2003/0039255 A1    Feb. 27, 2003

Related U.S. Application Data

(63) Continuation of application No. PCT/FR00/01810, filed on Jun. 28, 2000.

(30) Foreign Application Priority Data

Jun. 29, 1999    (FR)    ................................. 99 08331

(51) Int. Cl.
*H04M 3/42*    (2006.01)
(52) U.S. Cl. .............................. 379/211.03; 379/212.01
(58) Field of Classification Search ............ 379/220.01, 379/221.01, 207.02, 114.02, 265.02, 211.03, 379/211.02, 221.03, 365.01, 211.01, 32.02, 379/212.01, 211.04; 709/227; 706/25, 41, 706/38
See application file for complete search history.

(56) References Cited

U.S. PATENT DOCUMENTS

| 5,487,111 | A | * | 1/1996 | Slusky | 379/211.03 |
|---|---|---|---|---|---|
| 5,550,907 | A | * | 8/1996 | Carlsen | 379/211.02 |
| 5,799,072 | A | * | 8/1998 | Vulcan et al. | 379/114.02 |
| 5,822,400 | A | * | 10/1998 | Smith | 379/32.02 |
| 5,896,448 | A | * | 4/1999 | Holt | 379/221.03 |
| 5,905,789 | A | * | 5/1999 | Will | 379/211.03 |
| 5,933,490 | A | * | 8/1999 | White et al. | 379/221.01 |
| 5,983,004 | A | * | 11/1999 | Shaw et al. | 709/227 |
| 6,072,867 | A | * | 6/2000 | Lieuwen | 379/220.01 |
| 6,104,799 | A | * | 8/2000 | Jain et al. | 379/211.01 |
| 6,169,791 | B1 | * | 1/2001 | Pokress | 379/114.02 |
| 6,233,452 | B1 | * | 5/2001 | Nishino | 455/435.2 |
| 6,301,350 | B1 | * | 10/2001 | Henningson et al. | 379/220.01 |
| 6,519,333 | B1 | * | 2/2003 | Malik | 379/207.02 |
| 6,571,290 | B2 | * | 5/2003 | Selgas et al. | 709/228 |
| 6,606,381 | B1 | * | 8/2003 | Wunsch | 379/356.01 |
| 6,931,116 | B1 | * | 8/2005 | Gross et al. | 379/211.03 |

\* cited by examiner

*Primary Examiner*—Thjuan K Addy
(74) *Attorney, Agent, or Firm*—DLA Piper LLP (US)

(57) ABSTRACT

A process for management of data transfer to a specific destination station having at least one real address including defining a virtual address of a destination station comprising an ordered sequence of real addresses of the destination station, sequentially searching through different addresses until obtaining a positive response establishing a communications channel, and transferring data to a multiplicity of telecommunications supports, and a communication device including telephonic communications transport means and data transfer means, means for storing in a memory calls issued and/or received by a party, means for storing in the memory addresses enabling connection of the party and means for sequential calling of a destination station from a list of addresses, and means for the storage in the memory of a history of past communication sequences and means for modeling optimal sequences for a multiplicity of telecommunications supports.

12 Claims, No Drawings

ADAPTATION OF THE CALL SEQUENCE BY ANALYSIS OF THE HISTORY OF THE PRECEDING COMMUNICATION SEQUENCES

RELATED APPLICATION

This is a continuation of International Application No. PCT/FR00/01810, with an international filing date of Jun. 28, 2000, which is based on French Patent Application No. 99/08331, filed Jun. 29, 1999.

TECHNICAL FIELD

My disclosure pertains to computer-based telecommunications centers.

BACKGROUND

Telecommunications and digital data transfer converge with the use of X.25-type digital telecommunications standards and the TCP/IP data-transfer protocol. It is already possible to transfer telephone calls in an open network using the TCP/IP protocol.

In closed networks, use is made of Computer and Telecommunications Centers (CTC) in which the telecommunications equipment (PABX or terminal) is linked with the organization's computer system. The objective is to exchange information between the two environments so as to create new common applications. Thus, with the subscriber identification service present on digital communication systems and the switched telecommunication network (STN), a file pertaining to the caller can be imported from a database and displayed on the screen of the destination station computer even before the destination station responds to the call.

A simple microcomputer equipped with a modem and provided with telecommunications and answering-recording functions already represents a true CTC solution. The case of transmission of simple faxes from fax numbers recorded in a database could likewise be considered to be an elementary CTC.

Office automation CTC applications pertain to unified messaging (fax, voice, e-mail, paging), the display of client information in relation to its telephone number or personal code and the management of calls on the screen. Automatic Call Distribution (ACD), an automatic call distribution technique, enables regulation of the flows of incoming calls placed in waiting queues. At present, many companies and independent workers are equipped with separate electronic messaging, voice mail and fax systems. However, a unified messaging system that groups together all of these services is more advantageous. Such a system makes it possible to listen to, read and display the three types of messages from a single platform and to do so in the desired order. Moreover, the system can be parameterized to receive messages in a given form and transmit them in another form. Thus, by means of text conversion technology, electronic messages and faxes can be converted into voice messages accessible from a fixed or mobile telephone. The user has at his disposal a single telephone number. The computer then has to search for the party and to forward the correct message adapted to the correct terminal.

CTC increases productivity. Due to the evolution of the technologies, a CTC solution can operate, without central PABX, simply on a server equipped with voice cards. This "PCPABX" concept applies to small structures with at most 20 to 50 lines. Among its advantages, CTC promotes organization within the company. The circulation of paper is reduced in favor of electronic information transfers. Tools enable recognition and orientation of the caller in relation to predefined scripts, automatic calling up of the caller's file, personalization of waiting messages and messaging outside of working hours, and workflow management for all of the organization's services.

The various call centers using unified messaging confront a problem of optimizing the calls. The sequential search for a party through its different numbers can become quite time-consuming and tedious if this party has a large number of telephone and fax numbers, and digital addresses.

It would be advantageous to resolve this problem by providing a method enabling improvement of the connection means and optimization of the number of calls required to connect a party.

SUMMARY provide a process for management of data transfer to a specific destination station having at least one real address including defining a virtual address of a destination station comprising an ordered sequence of real addresses of the destination station, sequentially searching through different addresses until obtaining a positive response establishing a communications channel, and transferring data to a multiplicity of telecommunications supports.

I also provide a communication device including telephonic communications transport means and data transfer means, means for storing in a memory calls issued and/or received by a party, means for storing in the memory addresses enabling connection of the party and means for sequential calling of a destination station from a list of addresses, and means for the storage in the memory of a history of past communication sequences and means for modeling optimal sequences for a multiplicity of telecommunications supports.

DETAILED DESCRIPTION

I provide a process for the management of data transfers to a specific destination station possessing at least one real address comprising a step of definition of a virtual address of the destination station comprising the ordered sequence of the real addresses of said destination station, a step of sequential searching through the different addresses until obtaining a positive response establishing a communications channel and a data transfer step. At each failure and/or success in establishing communication, the communication parameters are stored in memory and the data stored in memory are processed so as to define the optimal communication establishment parameters.

The processing performed on the data stored in memory consists advantageously of an iterative learning process, particularly a neural network;

In one variant, the processing performed on the data stored in memory consists of a statistical processing.

I also provide a device comprising telephonic communications transport means and data transfer means, means for storing in memory the calls issued and/or received by a party, as well as means for storing in memory the addresses enabling connection of a party and means for the sequential calling of a destination station from the list of its addresses. It comprises means for the storage in memory of the history of past communication sequences and means for modeling the optimal sequences.

The disclosure applies in an integrated instruction management environment applicable to all types of telecommunications, including voice telecommunications (fixed or mobile telephone, IP voice protocol), data (fax, telephone messaging, electronic messaging, file transfer via modem) or mixtures thereof (teleconferencing).

The user's instructions (general or specific, permanent or temporary) can be specified in relation to the telecommunications supports, telephone numbers, identification numbers or the localization of the parties, the nature of the messages, and the time and place.

One application of the disclosure makes it possible for the user to be connected under all circumstances by connecting to his call partners or by the rapid and reliable transmission, by all of the available telecommunications supports, of their messages. The disclosure also allows the user to accelerate his search for his call partners (for the purpose of voice connections or message transmissions) and to optimize the associated telecommunication costs by the selective choice of the outgoing telecommunications network used ("Least Cost Routing").

The disclosure comprises automatic and semiautomatic modes. The automatic modes apply to the processing operations (generally the routing of calls or messages) which do not require intervention by an operator from the call center. The semiautomatic modes require intervention of an operator and enable the execution of higher functions (such as the interpretation of the party's requests, searching for or supplying information, scheduling appointments, interactive filtering). In the case of the semiautomatic modes, the automatic functions of the application are intended to enhance the productivity of the operators, the optimization of the telecommunications costs and the enhancement of the security of the data.

In a sequence of sequential calls of the different addresses of a party, it is possible that the party can always be reached via the same address at a given moment. A simple example consists of considering that a person will be at his workplace during the day and at home the rest of the time. A conventional sequential call will not make a distinction between these different possibilities unless an external operator had previously provided for such by specifying the call conditions. This quickly becomes tedious if one has many call partners.

In order to improve the number of successful calls, all of the parameters of a call are stored in memory. The most important parameters consist of the time and date of the call, call address, and success or failure of the call.

Based on these data, it is possible to perform a specific processing which evaluates the call partners' habits. A neural network is the most effective tool in this case. By means of iterative learning, it enables modification of the sequence of calls performed in relation to time. These modified sequences are stored in memory in a specific virtual address. In our example, it would try to reach the home of the person to be contacted before trying the workplace if it is midnight. In a variant, it could inform the caller that the party has never responded to a call after midnight and propose leaving a message for the next day.

Classic statistical methods such as principal component analysis can also be employed to reach these conclusions.

Since the call log is accessible at all times, it is very advantageous to update the information regarding the virtual addresses with each call, performing the processing of the information when the system activity is lower.

The disclosure is not limited to call centers or to unified messages; it applies to all fields in which the sequences of actions are predefined independently of the result of these actions.

The invention claimed is:

1. A process for management of data transfer to a specific destination station having a plurality of real addresses, the process being applied to a multiplicity of telecommunications supports and comprising:
 defining a virtual address of a destination station, said destination station having a plurality of real addresses;
 sequentially searching through the real addresses according to one of a plurality of time-related sequences until obtaining a positive response from a real address establishing a communications channel, said time-related sequence being a predetermined ordered sequence;
 transferring data by the communications channel;
 storing in a memory, time-related communication parameters concerning each failure in the establishment of a communications channel, and each success in the establishment of a communications channel;
 processing by an iterative statistical learning process in a neural network said time-related communications parameters stored in the memory by correlating at least one of the time-related communications parameters with the real address; and
 determining a new order of the time-related sequence for sequentially searching through the real addresses based on the correlation.

2. The process according to claim 1, wherein the communications parameters are selected from the group consisting of date and time.

3. A communication device comprising:
 telephonic communications transport means and data transfer means;
 means for storing in a memory calls issued and received by a party;
 means for storing in the memory addresses enabling connection of the party;
 means for sequential calling of a destination station from an ordered time-related list of addresses;
 means for the storage in the memory of a history of past communication sequences comprising time-related communications parameters concerning each failure in the establishment of a communications channel, and each success in the establishment of a communications channel;
 means for modeling optimal sequences for a multiplicity of telecommunications supports, said means for modeling processing by an iterative statistical learning process in a neural network of time-related communications parameters stored in the memory to model the optimal sequences; and
 means for modifying the order of the time-related list in which the addresses are sequentially called based on the optimal sequences.

4. The process according to claim 1, wherein one of the time-related communications parameters is time of day.

5. The process according to claim 1, wherein one of the time-related communications parameters is day of week.

6. A process for establishing communications with a specific destination station having a plurality of real addresses, the process comprising:
 defining a virtual address of a destination station depending on the time of the day or day of the week, the destination station having a plurality of real addresses;
 when a communication is directed to the virtual address, sequentially searching through the real addresses according to one of a plurality of time-related sequences until a positive response from a real address establishes a communications channel;

recording time-related data comprising the real address from which the positive response was received and one or more time-related parameters associated with the communication concerning each failure in the establishment of a communications channel, and each success in the establishment of a communications channel, at least one of the time-related parameters being selected from the group consisting of time of day and day of week;

processing by an iterative statistical learning process in a neural network the time-related parameters to determine an optimal order to sequentially search the real addresses for a particular time of day or day of week; and changing the order in which the real addresses are sequentially searched for the time of day or day of week.

7. The process according to claim 1, wherein establishing a communications channel is performed by selectively choosing an outgoing telecommunications network.

8. The process according to clam 7, wherein said selective choice is performed according to a least cost routing process.

9. The process according to claim 1, wherein determining a new order of the sequence is performed each time an attempt is made to establish a communications channel.

10. The process according to claim 1, wherein sequentially searching is performed automatically.

11. The process according to claim 1, wherein sequentially searching is performed semi-automatically in a way that an operator provides an extra service.

12. The process according to claim 11, wherein said extra service is at least one selected from the group consisting of interpretation of a party's requests, searching for or supplying information, scheduling appointments and interactive filtering.

* * * * *